(12) United States Patent
Tran

(10) Patent No.: US 8,419,206 B2
(45) Date of Patent: Apr. 16, 2013

(54) LUMINAIRE HAVING STRUCTURAL WALL WITH SELF-CAPTURING WIRE CHASE

(75) Inventor: Michael Trung Tran, Oakland, CA (US)

(73) Assignee: ABL IP Holding, LLC, Conyers, GA (US)

( * ) Notice: Subject to any disclaimer, the term of this patent is extended or adjusted under 35 U.S.C. 154(b) by 157 days.

(21) Appl. No.: 13/103,804

(22) Filed: May 9, 2011

(65) Prior Publication Data

US 2012/0008321 A1    Jan. 12, 2012

Related U.S. Application Data

(60) Provisional application No. 61/332,668, filed on May 7, 2010.

(51) Int. Cl.
*F21S 8/00*    (2006.01)
(52) U.S. Cl.
USPC ........ 362/147; 362/249.02; 439/114; 52/258; 174/480

(58) Field of Classification Search .................. 362/147, 362/249.02, 391; 439/114, 113, 211, 212; 174/47, 480; 52/287, 258, 259
See application file for complete search history.

(56) References Cited

U.S. PATENT DOCUMENTS

| | | | | |
|---|---|---|---|---|
| 5,024,614 A * | 6/1991 | Dola et al. | ..................... | 439/114 |
| 7,717,738 B2 * | 5/2010 | Mabry | .......................... | 439/501 |

* cited by examiner

*Primary Examiner* — Ali Alavi
(74) *Attorney, Agent, or Firm* — Beeson Skinner Beverly, LLC

(57) ABSTRACT

The structural wall of a luminaire has one or more light source retention cavities for holding area light sources such as OLED panels, and a wire chase or chases that extend from one light source cavity to another light source cavity in the structural wall, and/or from a light source cavity to a wire feed point for the structural wall. The wire chase or chases have a wire retaining bottom channel and a constricted wire entry opening at the top of the wire chase that is narrow in relation to the wire retaining bottom channel for capturing the wires therein. In another aspect of the invention, the wire chase or chases can be manufactured as separate parts, which can be inserted into the structural wall of the luminaire.

24 Claims, 6 Drawing Sheets

# LUMINAIRE HAVING STRUCTURAL WALL WITH SELF-CAPTURING WIRE CHASE

CROSS-REFERENCE TO RELATED APPLICATIONS

This application claims the benefit of U.S. Provisional Application No. 61/332,668 filed May 7, 2010, which is incorporated herein by reference.

BACKGROUND OF INVENTION

The present invention relates to electric luminaires and more particularly to electric luminaires having internal wiring for interconnecting light sources. The invention has particular application in luminaires having limited space for electrical wires, such as luminaires having planar OLED light sources where OLED panels are mounted on or in the structural walls of the luminaire and where no housing exists in which electric wires and leads can be contained and hidden from view. However, it will be understood that the invention is not limited to OLED luminaires.

Many luminaires are of the type where the body of the luminaire is a visual element in a space. Examples are ceiling suspended and wall mounted luminaires. Normally, such luminaires have some sort of housing component that contains and hides the electrical wiring of the luminaire, sometimes with other components such as ballasts needed for fluorescent lighting. Such visible luminaire need to provide a path for the wires to travel and some sort of containment for the wires.

The emergence of energy efficient area light sources such as OLEDs has made it possible to design luminaires entirely of thin structural walls where the light sources are mounted or set into the structural wall without any surrounding structure. For example an OLED luminaire could be comprised of a flat panel having one or more suspension points with a series of inset OLED panels. Such luminaires would be aesthetically pleasing, but present a problem as to where to put and how to contain the wires used to electrify the OLED panels without disturbing the aesthetic properties of the luminaire.

SUMMARY OF INVENTION

The present invention provides for a luminaire structural wall having a self-capturing wire chase wherein wires interconnecting light sources and connecting the light sources to an external power supply can readily be placed into and contained by the structural walls of the luminaire. For example, OLED luminaires have recently been devised where an array of spaced apart OLED panels are placed in OLED retention cavities in structural walls of the luminaire. The present invention allows the OLED panels to be wired together without the wires exiting the luminaire walls. The wires are easily installed in the luminaire walls and once installed are contained within the walls so that they do not dislodge or pop-out. In one aspect of the invention, a self-capturing wire chase structure is provided that can be easily manufactured at relatively low cost.

A luminaire in accordance with the invention comprises at least one area light source, such as an OLED panel, and a structural wall having at least one, and suitably more than one light source retention cavity for holding the area light source, and having a wire feed point. A wire chase proved in the structural wall extends from one light source cavity to another light source cavity in the structural wall, or from a light source cavity to a wire feed point for the structural wall. The wire chase has a wire retaining bottom channel and a constricted wire entry opening at the top of the wire chase that is narrow in relation to the wire retaining bottom channel. The wire retaining bottom channel has a width that is sufficient to hold more than one of the luminaire wires, and the wire entry opening has a width that allows one wire of the luminaire wires to pass therethrough, but not wide enough to allow the passage of more than one wire at the same time.

In another aspect of the invention, the wire chase can be manufactured as a separate part, which can be inserted into the structural wall of the luminaire. Still other aspects of the invention will be apparent from the following specification and claims.

DESCRIPTION OF THE ILLUSTRATED EMBODIMENTS

As used herein, "area light source" shall mean any light source that lies or can be provides substantially entirely in a flat or curved plane, for example, Organic Light Emitting Diodes (OLEDs), edge-lit LED flat panel lights, or quantum dot LEDs (QDLEDs).

Figure 1:
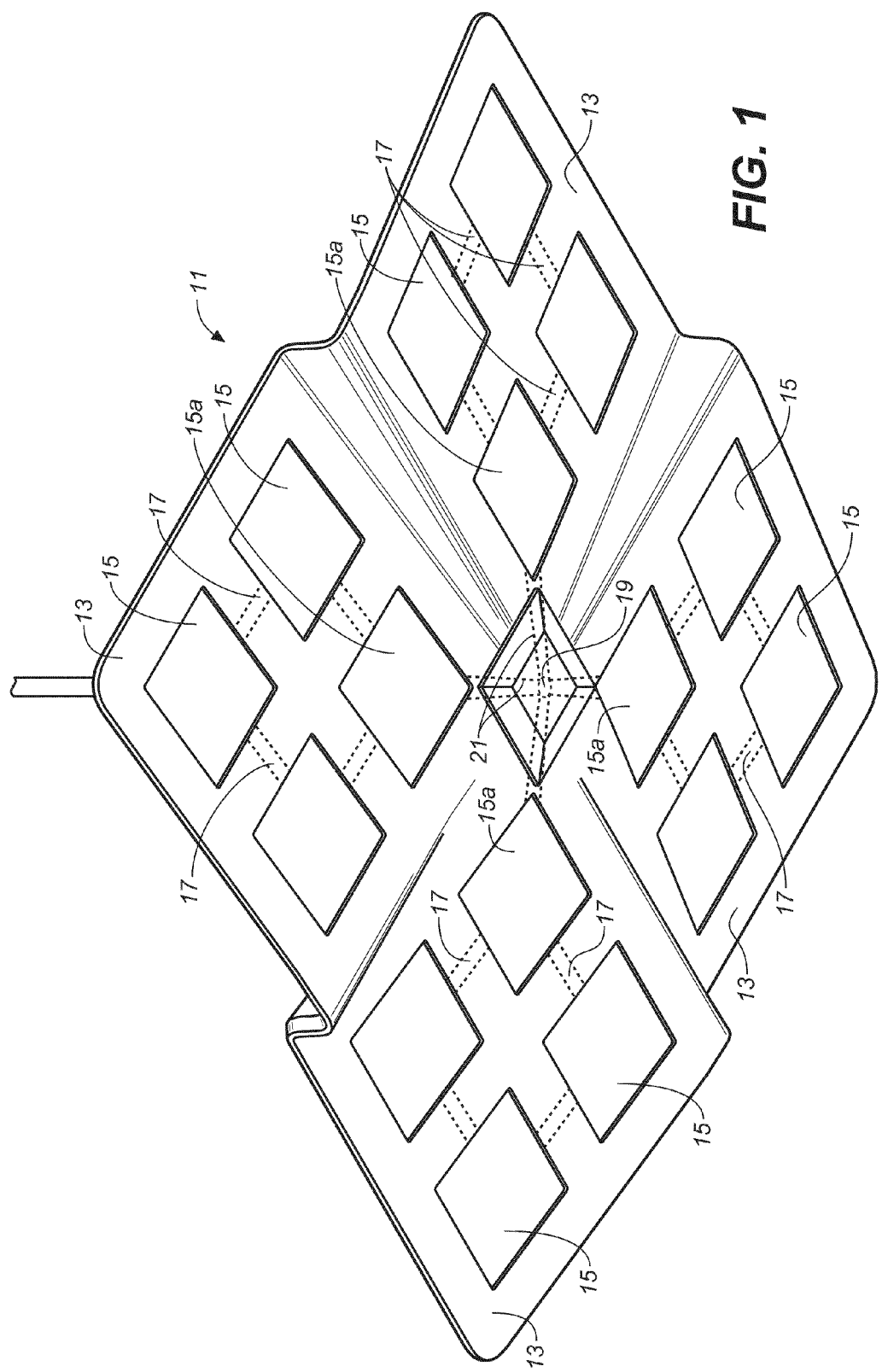
FIG. 1 is a bottom perspective view of an OLED luminaire having structural walls with OLED retention cavities interconnected with self-capturing wire chases in accordance with the invention.

FIG. 1 shows an example of an OLED luminaire having no housing wire-ways through which the OLED light sources of the luminaire can be electrically interconnected, and in which self-capturing wire chases in accordance with the invention can be advantageously used. Referring to FIG. 1, it is seen that the illustrated OLED luminaire 11 has four joined thin structural walls 13, each including four OLED retention cavities 15 for holding the OLED panels of the luminaire. Each of the retention cavities 15 is connected one to the other by a self-capturing wire chase 17 hereinafter described to allow one cavity to be wired to the next cavity. Additionally, the interior corner fed retention cavity 15a of each structural wall is connected to a wire feed point 19 at the center of the luminaire by similar self-capturing wire chases 21, which extend radially from the center of the luminaire to each of the corner fed retention cavities. Using the self-capturing wire chase 17, 21, the luminaire can be completely wired by inserting the required electrical wires and lead wires into the wire chases as hereinafter described.

Figure 2:
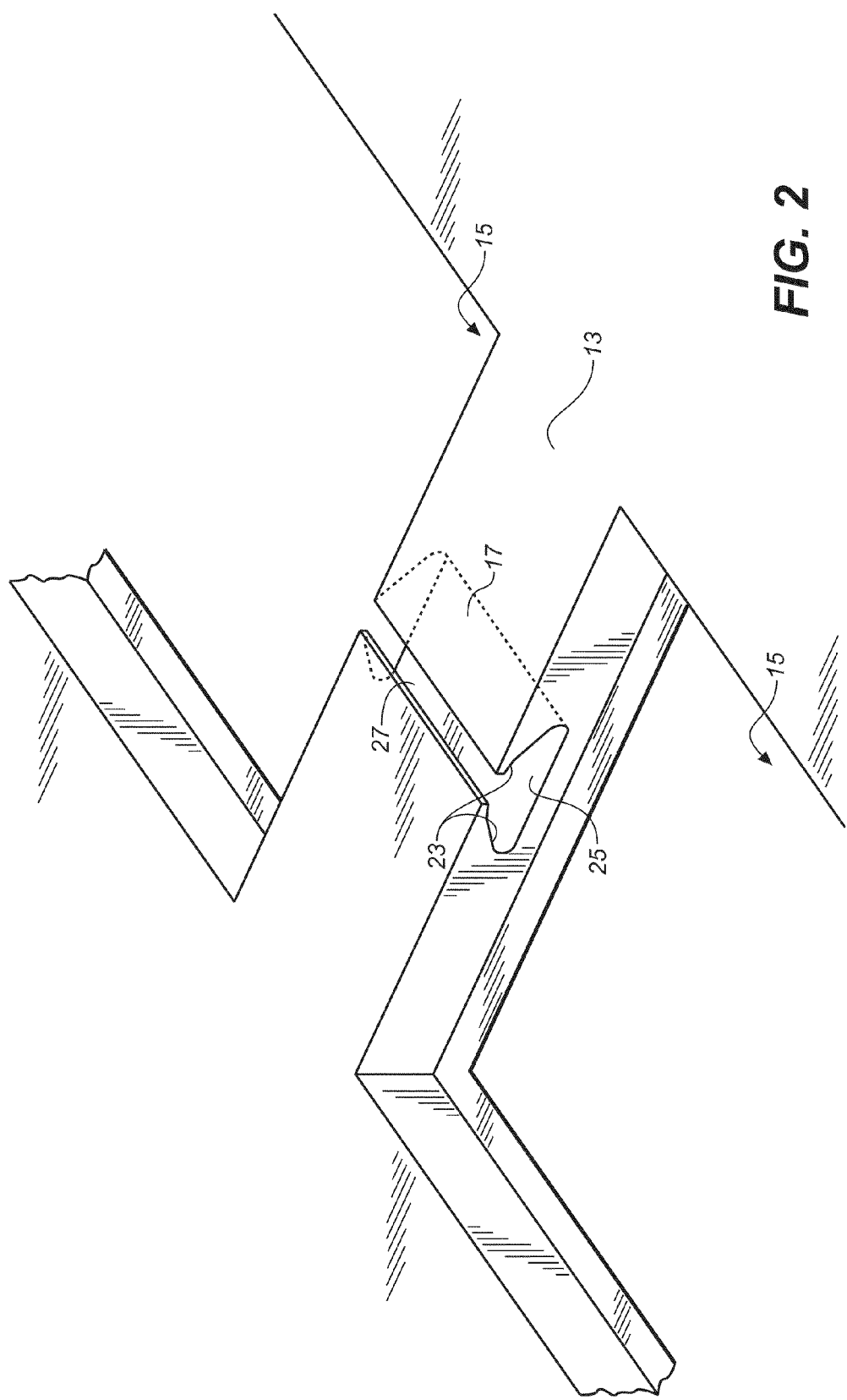
FIG. 2 is a top perspective view of a portion of structural wall of an OLED luminaire such as shown in FIG. 1, showing two OLED retention cavities interconnected by a self-capturing wire chase in accordance with the invention.
Figure 3:
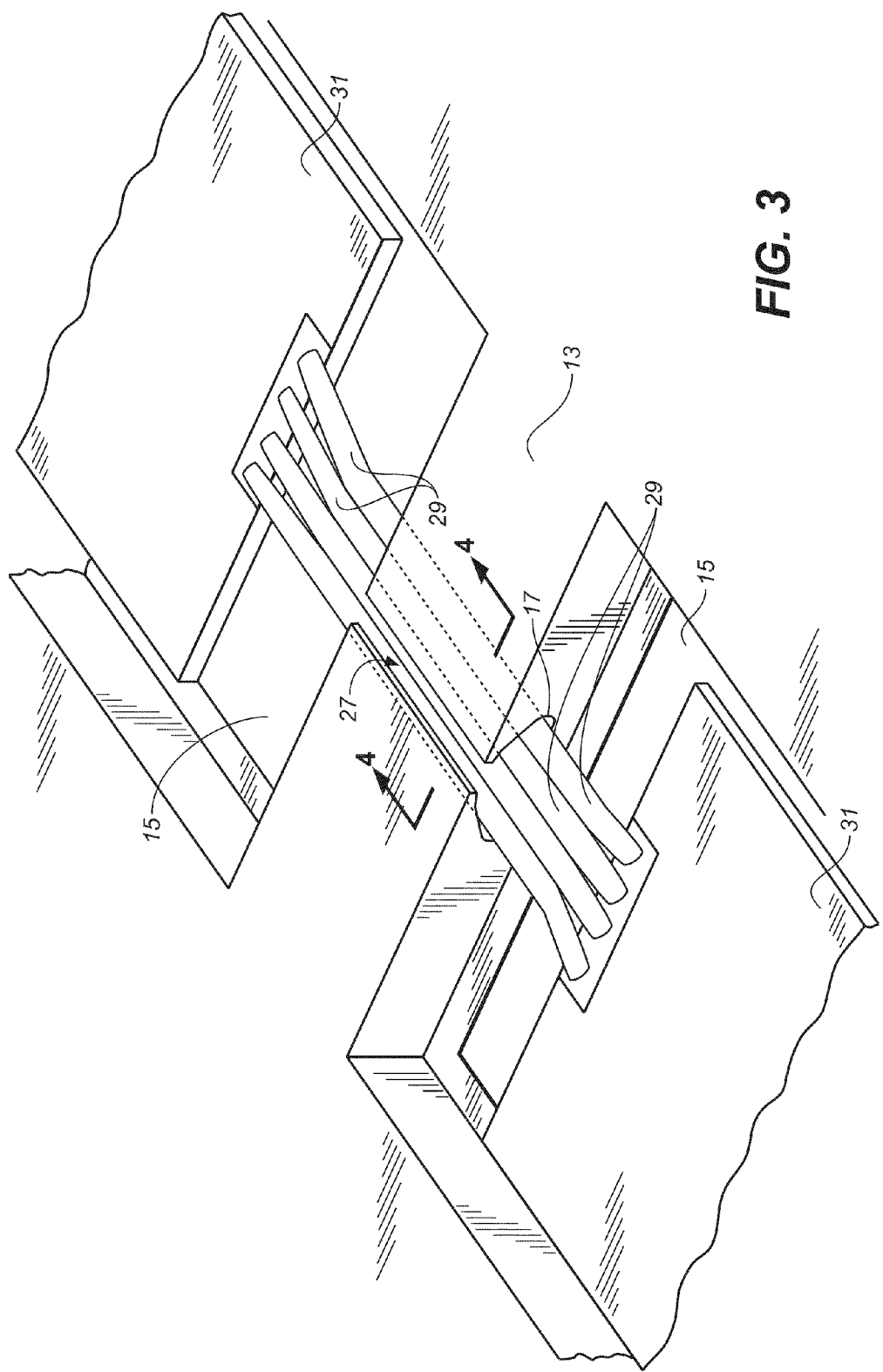
FIG. 3 is a top perspective view of a structural wall of an OLED luminaire as shown in FIG. 2, further showing OLED panels placed within the OLED retention cavities and electrical wires running through the self-capturing wire chase for connecting the OLED panels.

FIGS. 2-3 show in more detail the configuration of the self-capturing wire chases illustrated in FIG. 1. Shown is a wire chase 17 connecting two OLED retention cavities, however, it will be understood that FIGS. 2-3 would describe the wire chase between the center wire feed 19 and corner fed retention cavities 15a as well.

Figure 4:
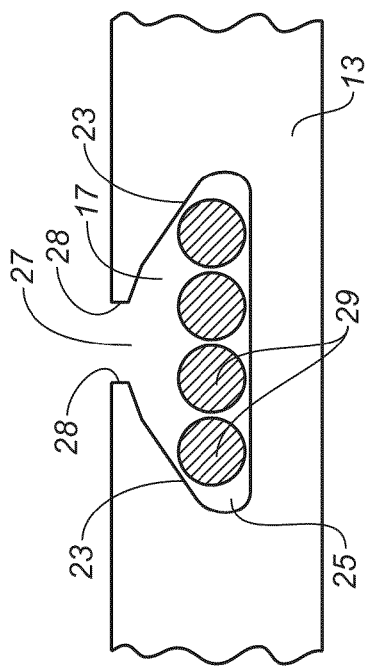
FIG. 4 is a cross-sectional view thereof taken along section lines 4-4 in FIG. 3.

Referring to FIGS. 2-3, wire chase 17 is formed in the luminaire's structural wall 13 by an under-cut that creates outwardly flared channel walls 23 and an enlarged wire retaining bottom channel 25. The wire entry opening 27 at the top of the wire chase is seen to be relatively narrow as compared to bottom channel 25. This opening has sufficient width to allow a wire to be passed through the opening, but not so wide as to allow more the one wire to pass through at a time. By keeping the wire entry opening small in relation to enlarged wire retaining bottom channel 25, wires inserted into the wire chase will be captured in the enlarged bottom channel and will tend to stay in the wire chase without dislodging. Preferably, the wire entry opening is sized so that wires must to be press fit into the wire chase by compression of the insulation layer surrounding the wires. Recovery of the shape of the wire's insulation layer after it is pressed into the chase will enhance the ability of the wire chase to capture the wires without any of escape. Preferably, the opposed edges 28 of wire entry opening 27 will FIGS. 3 and 4 show how the above-described wire chase would hold four wires connecting two OLED panels contained in side-by-side OLED retention cavities. The four wires 29 would be connected at each end to the OLEDs 31 resting in the retention cavities 15 and one-by-one pressed into the wire entry opening 27 of the wire chase, where they will spread out in the enlarged bottom channel 25 as generally shown in FIG. 4. The wires are captured in the wire chase without the need to cover the chase due to the constricted wire entry point.

A structural wall of a luminaire can be provided with an under-cut wire chase in accordance with the invention by different fabrication processes such as machining the chase into the wall structure or by fabricating the body of the luminaire using a 3D printing process. It is contemplated that wire chase can be provided in luminaire bodies made of plastic or a metal/plastic composite material such as Reynobond®. However, because of the under-cut, luminaire bodies provided with wire chases as shown in FIGS. 3 and 4 could not be suitably fabricated as a molded part.

Figure 6:
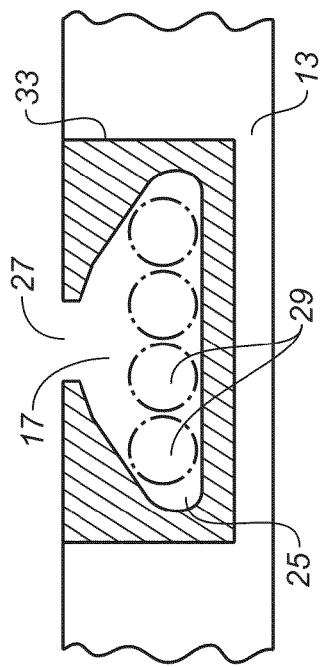
FIG. 6 is a cross-sectional view thereof taken along section lines 6-6 in FIG. 5A.
Figure 5A:
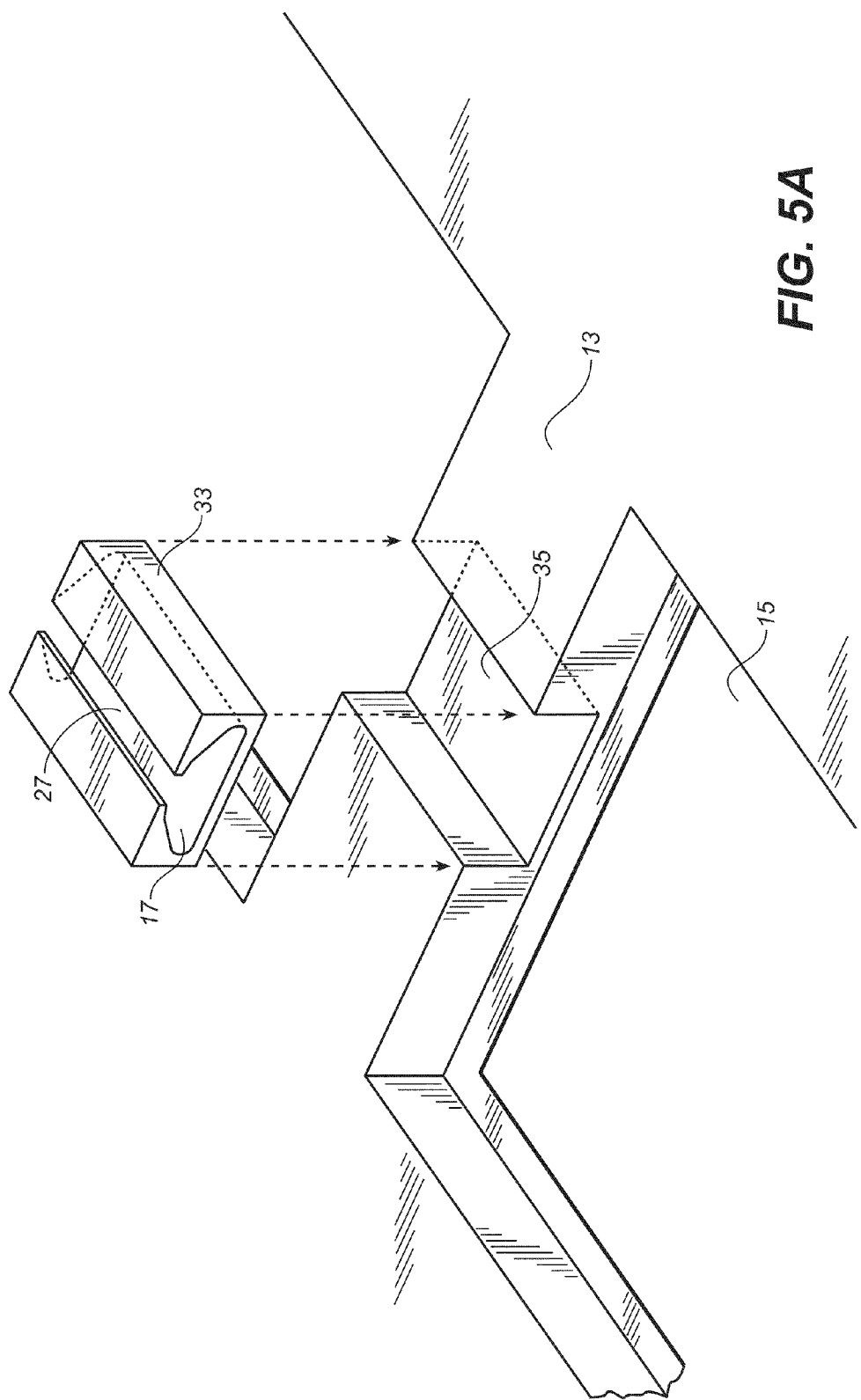
FIG. 5A is an exploded view of an alternative embodiment of the wire chase shown in the foregoing figures, wherein the wire chase is provided by means of a wire chase insert that is manufactured separately from body of the luminaire.
Figure 5B:
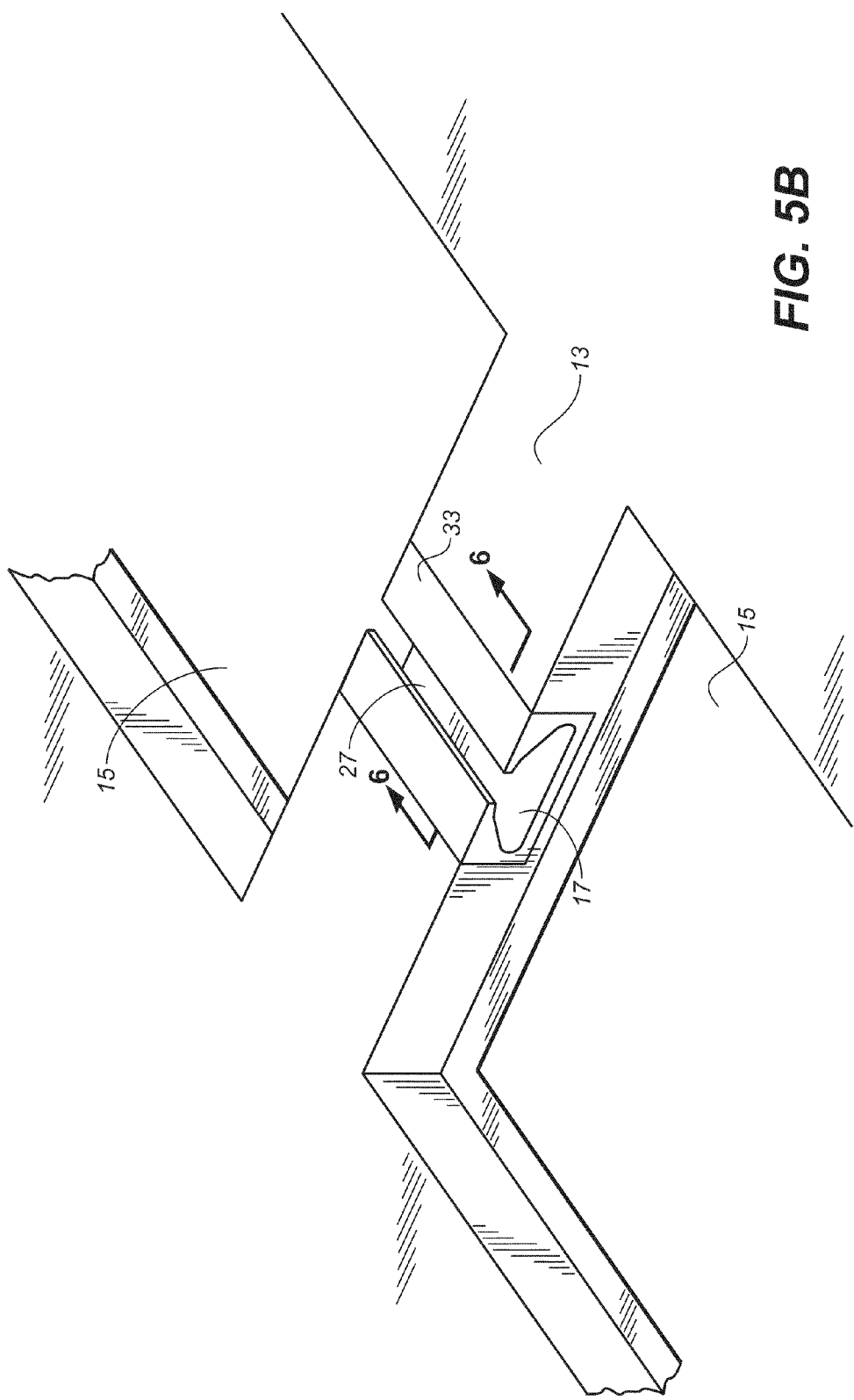
FIG. 5B is an assembled view thereof.

FIGS. 5A, 5B and 6 show an alternative construction for the wire chase in accordance with the invention which would allow the luminaire to be manufactured at a lower cost. Here, the self-capturing wire chase 17 is provided in a separate wire chase part, preferably an insert part 33, which can have a uniform cross-sectional shape so that it can be inexpensively fabricated from an extrusion, such as a plastic extrusion. The insert part fits into an open channel 35 in the structure wall 13 of the luminaire and is retained in this channel by any suitable means, such as by gluing the insert into the channel or sizing the open channel such that the insert can be press fit into the channel. The side walls of the open channel 35 will preferably be provided with a slight draft angle to allow this part of the luminaire to be a molded part.

It is seen that the path of the open channel 35 corresponds to the path of the wire chase, in this case between the two illustrated OLED retention cavities 15. The insert part 33 will preferably be provided in a length that substantially corresponds to the length of this channel such that the terminus of each end of the wire chase occurs at the OLED retention cavities. However, it would be possible to provide wire chase insert parts that are longer or shorter than the channels into which they are inserted, or to provide insertion parts in multiple short sections which can be inserted into a channel, such as channel 35, with or without gaps between the sections.

While the invention has been described in considerable detail in the foregoing specification and the accompanying drawings, it shall be understood that it is not intended that the invention be limited to such detail, except as necessitated be the following claims.

What I claim is:

1. A luminaire comprising:
    at least one area light source,
    a structural wall having a wire feed point and at least one light source retention cavity for holding said area light source,
    wires for electrifying said area light source, and
    at least one wire chase in said structural wall for containing luminaire wires therein, said wire chase extending from said light source cavity to either another light source cavity in said structural wall or to the wire feed point for the structural wall,
    said wire chase having a wire retaining bottom channel and a constricted wire entry opening at the top of the wire chase that is narrow in relation to the wire retaining bottom channel, said wire retaining bottom channel having a width that is sufficient to hold more than one of the luminaire wires, and said wire entry opening having a width that allows one wire of the luminaire wires to pass therethrough, but not wide enough to allow the passage of more than one wire at a time.

2. The luminaire of claim 1 wherein the wires of the luminaire are surrounded by a compressible insulation layer, and wherein the wire entry opening of said wire chase is sized so that wires must be press fit into the wire chase by compression of the wire's insulation layer.

3. The luminaire of claim 1 wherein the wire entry opening of said wire chase has opposed edges which provide surfaces over which the wires ride as they are pushed into the wire chase.

4. The luminaire of claim 1 wherein said wire chase includes channel walls that flare outwardly from the wire opening thereof to form said wire retaining bottom channel.

5. The luminaire of claim 1 wherein said wire chase is cut directly into the structural wall of said luminaire.

6. The luminaire of claim 1 wherein said wire chase is provided in a separate wire chase part secured to the structural wall of the luminaire.

7. The luminaire of claim 6 wherein the structural wall has an open channel for the path of the wire chase, and wherein said separated wire chase part is inserted into said open channel.

8. A luminaire comprising:
    at least two area light sources,
    a structural wall having a wire feed point and a light source retention cavity for each of said area light sources,
    wires for interconnecting and electrifying each of said area light sources and for providing an electrical feed from the wire feed point of said structural wall, and
    wire chases in the structural wall for containing the luminaire wires within said structural wall, said wire chases extending from one light source cavity to another light source cavity in said structural wall and from a light source cavity to the wire feed point for the structural wall,
    each of said wire chases having a wire retaining bottom channel and a constricted wire entry opening at the top of the wire chase that is narrow in relation to the wire retaining bottom channel, said wire retaining bottom channel having a width that is sufficient to hold more than one of the luminaire wires, and said wire entry opening having a width that allows one wire of the luminaire wires to pass therethrough, but not wide enough to allow the passage of more than one wire at a time.

9. The luminaire of claim 8 wherein the wires of the luminaire are surrounded by a compressible insulation layer, and wherein the wire entry opening of each of said wire chases is sized so that wires must be press fit into the wire chases by compression of the wire's insulation layer.

10. The luminaire of claim 8 wherein the wire entry opening of each of said wire chases has opposed edges which provide surfaces over which the wires ride as they are pushed into the wire chase.

11. The luminaire of claim 8 wherein said wire chases include channel walls that flare outwardly from the wire opening thereof to form said wire retaining bottom channel.

12. The luminaire of claim 8 wherein said wire chases are cut directly into the structural wall of said luminaire.

13. The luminaire of claim 8 wherein at least some of said wire chases are provided in separate wire chase parts secured to the structural wall of the luminaire.

14. The luminaire of claim 13 wherein the structural wall has open channels for the paths of the wire chases, and wherein said separate wire chase parts are inserted into said open channels.

15. The luminaire of claim 8 wherein the area light sources of the luminaire are OLED panels set into OLED retention cavities in said structural wall.

16. A luminaire having area light sources and wires for electrifying each of the area light sources, comprising:
    at least two joined structural walls, each having a light source retention cavities for the luminaire's area light sources, and each having a wire feed point,
    wire chases in each of said structural walls containing the luminaire wires within each of said structural walls, said wire chases extending from one light source cavity to another light source cavity in said structural walls,
    each of said wire chases having a wire retaining bottom channel and a constricted wire entry opening at the top of the wire chase that is narrow in relation to the wire retaining bottom channel, said wire retaining bottom channel having a width that is sufficient to hold more than one of the luminaire wires, and said wire entry opening having a width that allows one wire of the luminaire wires to pass therethrough, but not wide enough to allow the passage of more than one wire at a time.

17. The luminaire of claim 16 wherein said wire chases further include a wire chase from one of the light source cavities in each structural wall to the wire feed point for the structural walls.

18. The luminaire of claim 16 wherein the wires of the luminaire are surrounded by a compressible insulation layer, and wherein the wire entry opening of each of said wire chases of each of said structural walls is sized so that wires must be press fit into the wire chases by compression of the wire's insulation layer.

19. The luminaire of claim 16 wherein the wire entry opening of each of said wire chases has opposed edges which provide surfaces over which the wires ride as they are pushed into the wire chase.

20. The luminaire of claim 16 wherein said wire chases include channel walls that flare outwardly from the wire opening thereof to form said wire retaining bottom channel.

21. The luminaire of claim 16 wherein said wire chases are cut directly into the structural walls of said luminaire.

22. The luminaire of claim 16 wherein at least some of said wire chases are provided in separate wire chase parts secured to the structural wall of the luminaire.

23. The luminaire of claim 22 wherein the structural walls have open channels for the paths of the wire chases, and wherein said separate wire chase parts are inserted into said open channels.

24. The luminaire of claim 16 wherein the structural walls have a common feed point and wherein said wire chases include a wire chase in each of said structural walls that extends from one of the light source retention cavities of each of said structural wall to said common feed point.

* * * * *

UNITED STATES PATENT AND TRADEMARK OFFICE
CERTIFICATE OF CORRECTION

PATENT NO. : 8,419,206 B2  
APPLICATION NO. : 13/103804  
DATED : April 16, 2013  
INVENTOR(S) : Michael Trung Tran Page 1 of 1

It is certified that error appears in the above-identified patent and that said Letters Patent is hereby corrected as shown below:

In the Specification
In column 1, line 29, "luminaire" should read --luminaires--.
In column 2, line 45, "provides" should read --provided--.
In column 3, line 14, "more the" should read --more than--.
In column 3, line 24, --chance-- should be inserted between "any" and "of".
In column 3, line 25, --have relatively smooth surfaces, such as a flat or a radius, over which the wires can ride when they are pushed into the wire chase, and to prevent sharp edges that could cut into the wire insulation.-- should be inserted after "will".
In column 3, line 41, "chase" should read --chases--.

Signed and Sealed this
Tenth Day of December, 2013

Margaret A. Focarino
*Commissioner for Patents of the United States Patent and Trademark Office*